(12) United States Patent
Lin et al.

(10) Patent No.: US 12,355,989 B2
(45) Date of Patent: Jul. 8, 2025

(54) IMAGE ENCODING METHOD AND APPARATUS, AND IMAGE DECODING METHOD AND APPARATUS

(71) Applicant: Shenzhen Yinwang Intelligent Technologies Co., Ltd., Shenzhen (CN)

(72) Inventors: Yongbing Lin, Beijing (CN); Sha Ma, Beijing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 306 days.

(21) Appl. No.: 17/970,684

(22) Filed: Oct. 21, 2022

(65) Prior Publication Data

US 2023/0061368 A1    Mar. 2, 2023

Related U.S. Application Data

(63) Continuation of application No. PCT/CN2020/086517, filed on Apr. 23, 2020.

(51) Int. Cl.
  *H04N 19/186*   (2014.01)
  *H04N 19/176*   (2014.01)
  *H04N 19/184*   (2014.01)
(52) U.S. Cl.
  CPC ......... *H04N 19/186* (2014.11); *H04N 19/176* (2014.11); *H04N 19/184* (2014.11)
(58) Field of Classification Search
  CPC ... H04N 19/186; H04N 19/176; H04N 19/184
  USPC .................................................... 375/240.24
  See application file for complete search history.

(56) References Cited

U.S. PATENT DOCUMENTS

| | | | |
|---|---|---|---|
| 8,169,490 B2 * | 5/2012 | Kondo | H04N 23/6811 348/208.1 |
| 2004/0179743 A1 | 9/2004 | Shibata et al. | |
| 2006/0083432 A1 | 4/2006 | Malvar | |
| 2009/0160992 A1 | 6/2009 | Inaba et al. | |

(Continued)

FOREIGN PATENT DOCUMENTS

| | | |
|---|---|---|
| CN | 1299560 A | 6/2001 |
| CN | 101472048 A | 7/2009 |

(Continued)

OTHER PUBLICATIONS

Chen Yu-tuo et al.,"Color Image Coding Based on Chromatism Analysis and JPEG2000", Journal of Chinese Computer Systems, vol. 28, No. 6, 2007, with an English abstract, 7 pages.

(Continued)

*Primary Examiner* — Matthew David Kim
(74) *Attorney, Agent, or Firm* — Conley Rose, P.C.

(57) ABSTRACT

An image encoding method includes a color difference signal Cr corresponding to a first pixel and a color difference signal Cb corresponding to a second pixel that are determined based on a pixel value of the first pixel, a pixel value of the second pixel, and pixel values of a third pixel and a fourth pixel that are adjacent to the first pixel. Then, an average value Co of the color difference signal Cr corresponding to the first pixel and the color difference signal Cb corresponding to the second pixel, and a difference value Cg between the color difference signal Cr and the color difference signal Cb are determined.

20 Claims, 6 Drawing Sheets

(56) References Cited

U.S. PATENT DOCUMENTS

| | | | | |
|---|---|---|---|---|
| 2010/0013757 | A1* | 1/2010 | Ogikubo | H04N 19/59 |
| | | | | 345/156 |
| 2011/0043671 | A1 | 2/2011 | Yamaguchi et al. | |
| 2011/0158521 | A1* | 6/2011 | Park | H04N 1/644 |
| | | | | 382/166 |
| 2012/0219216 | A1 | 8/2012 | Sato | |
| 2013/0100310 | A1* | 4/2013 | Ebihara | H04N 23/00 |
| | | | | 348/222.1 |
| 2013/0266219 | A1* | 10/2013 | Kurita | G06T 5/70 |
| | | | | 382/167 |
| 2013/0300893 | A1* | 11/2013 | Takada | G06T 3/4015 |
| | | | | 348/223.1 |
| 2015/0381995 | A1 | 12/2015 | Han et al. | |
| 2016/0180807 | A1 | 6/2016 | Chen et al. | |
| 2016/0284105 | A1* | 9/2016 | Dawood | H04N 19/137 |
| 2017/0039682 | A1* | 2/2017 | Oh | G06T 7/90 |
| 2017/0118476 | A1* | 4/2017 | Sakamoto | H04N 19/103 |
| 2021/0005015 | A1* | 1/2021 | Ghosh | G01N 21/55 |
| 2021/0304445 | A1* | 9/2021 | Yoo | G06N 20/00 |
| 2021/0350505 | A1* | 11/2021 | Lee | G06T 7/90 |

FOREIGN PATENT DOCUMENTS

| | | |
|---|---|---|
| CN | 101656889 A | 2/2010 |
| CN | 101998127 A | 3/2011 |
| CN | 102577388 A | 7/2012 |
| CN | 102800110 A | 11/2012 |
| CN | 102905083 A | 1/2013 |
| CN | 103313066 A | 9/2013 |
| CN | 103348675 A | 10/2013 |
| CN | 105635700 A | 6/2016 |
| CN | 105741327 A | 7/2016 |
| CN | 110163149 A | 8/2019 |
| WO | 2007044953 A2 | 4/2007 |
| WO | 2020043279 A1 | 3/2020 |

OTHER PUBLICATIONS

ITU-T H.264, Series H: Audiovisual and Multimedia Systems; Infrastructure of audiovisual services Coding of moving video; Advanced video coding for generic audiovisual services, Jun. 2019, 836 pages.

ITU-T H.265, Series H: Audiovisual and Multimedia Systems; Infrastructure of audiovisual services Coding of moving video; High efficiency video coding, Nov. 2019, 712 pages.

Suzuki Taizo: "Wavelet-Based Spectral-Spatial Transforms for CFA-Sampled Raw Camera Image Compression", IEEE Transactions on Image Processing, vol. 29, Jul. 17, 2019, pp. 433-444, XP011747605, 12 pages.

Henrique S Malvar et al: "Progressive-to-Lossless Compression of Color-Filter-ArrayImages Using Macropixel Spectral-Spatial Transformation", Data Compression Conference (DCC), 2012, IEEE, Apr. 10, 2012, pp. 3-12, XP032172464, 10 pages.

Richter Thomas et al: "Bayer Pattern Compression with JPEG XS", 2019 IEEE International Conference on Image Processing (ICIP), IEEE, Sep. 22, 2019, pp. 3177-3181, XP033647333, 5 pages.

* cited by examiner

| R | G | R | G | R | G | R | G |
|---|---|---|---|---|---|---|---|
| G | B | G | B | G | B | G | B |

| G | R | G | R | G | R | G | R |
|---|---|---|---|---|---|---|---|
| B | G | B | G | B | G | B | G |

| R | Y | R | Y | R | Y | R | Y |
|---|---|---|---|---|---|---|---|
| Y | B | Y | B | Y | B | Y | B |

| Y | R | Y | R | Y | R | Y | R |
|---|---|---|---|---|---|---|---|
| B | Y | B | Y | B | Y | B | Y |

Image encoding apparatus 700

Image decoding apparatus 800

Image encoding apparatus 900

Image decoding apparatus 1000

IMAGE ENCODING METHOD AND APPARATUS, AND IMAGE DECODING METHOD AND APPARATUS

CROSS-REFERENCE TO RELATED APPLICATIONS

This application is a continuation of International Patent Application No. PCT/CN2020/086517 filed on Apr. 23, 2020, the disclosure of which is hereby incorporated by reference in its entirety.

TECHNICAL FIELD

Embodiments of this application relate to the field of image encoding and decoding, and in particular, to an image encoding method and apparatus, and an image decoding method and apparatus.

BACKGROUND

A camera features high resolution, non-contact measurement, passive measurement, convenient use, and low costs, and is a necessary sensor for environment awareness in self-driving and the like. With continuous increases of resolution, a frame rate, a sampling depth, and the like of the camera, a video output requires increasingly high transmission bandwidths. To alleviate network transmission pressure, an image encoding (or image compression) method is generally used to reduce a bandwidth requirement. Safety comes first in self-driving, and a time delay introduced by image encoding is relatively sensitive on the premise of ensuring encoding performance.

Based on this, in an image encoding process, how to perform color conversion to remove redundant information between color signals, improve encoding and compression performance, and reduce computation complexity is a technical problem that needs to be resolved.

SUMMARY

Embodiments of this application provide an image encoding method and apparatus, and an image decoding method and apparatus, to resolve a problem about how to perform color conversion to remove redundant information between color signals, improve encoding and compression performance, and reduce computation complexity.

According to a first aspect, an image encoding and decoding method is provided, and is applied to an image encoding apparatus. The image encoding apparatus encodes a first pixel, a second pixel, a third pixel, and a fourth pixel in a first image. A color component of the third pixel is the same as a color component of the fourth pixel, and color components of the first pixel, the second pixel, and the third pixel are different. First, a color difference signal Cr corresponding to the first pixel is determined based on a pixel value of the first pixel in the first image and pixel values of the third pixel and the fourth pixel that are adjacent to the first pixel. A color difference signal Cb corresponding to the second pixel is determined based on a pixel value of the second pixel in the first image and the pixel values of the third pixel and the fourth pixel that are adjacent to the second pixel. Then, an average value Co of the color difference signal Cr corresponding to the first pixel and the color difference signal Cb corresponding to the second pixel and a difference value Cg between the color difference signal Cr corresponding to the first pixel and the color difference signal Cb corresponding to the second pixel are determined. Further, a difference value Dg between the pixel values of the third pixel and the fourth pixel is determined, and an average value Y of the pixel value of the first pixel, the pixel value of the second pixel, the pixel value of the third pixel, and the pixel value of the fourth pixel is determined. In conclusion, the difference value Dg, the average value Y, the average value Co, and the difference value Cg may be output.

The difference value Cg between the color difference signal Cb and the color difference signal Cr is determined, and the difference value Cg is smaller than values of the color difference signal Cb and the color difference signal Cr, so that a relatively small quantity of bits can be occupied, a transmission bandwidth is reduced, and encoding performance is improved. The average value Co of the color difference signal Cb and the color difference signal Cr is determined to counteract noise of the color difference signal Cb and the color difference signal Cr. When the first image is a raw image, the color difference signal Cb and the color difference signal Cr have redundant information. The difference value Cg and the average value Co are calculated to remove the redundant information, thereby reducing computation complexity.

In a possible implementation, when the color difference signal Cr corresponding to the first pixel is determined, a difference value between the pixel value of the first pixel and an average value Ga may be determined as the color difference signal Cr corresponding to the first pixel, where the average value Ga is an average value of the third pixel and the fourth pixel.

In a possible implementation, when the color difference signal Cb corresponding to the second pixel is determined, a difference value between the pixel value of the second pixel and the average value Ga may be determined as the color difference signal Cb corresponding to the second pixel, where the average value Ga is the average value of the third pixel and the fourth pixel.

In a possible implementation, the color component of the first pixel is a first color component, the color component of the second pixel is a second color component, and the color components of the third pixel and the fourth pixel are third color components.

In a possible implementation, the first color component is a red (R) color component, the second color component is a blue (B) color component, and the third color component is a green (G) color component.

In a possible implementation, the first color component is an R color component, the second color component is a B color component, and the third color component is a yellow (Y') color component. A color component of a pixel is related to a color filter of a camera.

In a possible implementation, the first pixel, the second pixel, the third pixel, and the fourth pixel form a 2*2 image block in the first image.

In a possible implementation, the first image includes the first color component, the second color component, and the third color component. The first pixel, the second pixel, the third pixel, and the fourth pixel each have only one color component.

In a possible implementation, the third pixel and the fourth pixel are located in different rows and different columns in the 2*2 image block.

According to a second aspect, an image decoding method is provided, and is applied to an image decoding apparatus. The image decoding apparatus is configured to decode pixel values of a first pixel, a second pixel, a third pixel, and a fourth pixel in a first image. A color component of the third pixel is the same as a color component of the fourth pixel, and color components of the first pixel, the second pixel, and the third pixel are different. First, a color difference signal Cr corresponding to the first pixel and a color difference signal Cb corresponding to the second pixel are determined based on an average value Co of the color difference signal Cr corresponding to the first pixel and the color difference signal Cb corresponding to the second pixel and a difference value Cg between the color difference signal Cr corresponding to the first pixel and the color difference signal Cb corresponding to the second pixel in the first image. Then, the pixel value of the first pixel and the pixel value of the second pixel are determined based on the color difference signal Cr corresponding to the first pixel and the color difference signal Cb corresponding to the second pixel, a difference value Dg between the pixel values of the third pixel and the fourth pixel in the first image, and an average value Y of the pixel value of the first pixel, the pixel value of the second pixel, the pixel value of the third pixel, and the pixel value of the fourth pixel. Next, the pixel value of the first pixel, the pixel value of the second pixel, the pixel value of the third pixel, and the pixel value of the fourth pixel are output.

In a possible implementation, a difference value between the average value Co and half of the difference value Cg is determined as the color difference signal Cr corresponding to the first pixel in the first image. A sum of the average value Co and half of the difference value Cg is determined as the color difference signal Cb corresponding to the second pixel in the first image.

In a possible implementation, when the pixel value of the first pixel and the pixel value of the second pixel are determined, a sum of the color difference signal Cr corresponding to the first pixel and the color difference signal Cb corresponding to the second pixel may be first determined, then ¼ of the sum is determined, and a difference value Ga between the average value Y and ¼ of the sum is determined. Finally, a sum of the difference value Ga and the color difference signal Cr corresponding to the first pixel is determined as the pixel value of the first pixel, and a sum of the difference value Ga and the color difference signal Cb corresponding to the second pixel is determined as the pixel value of the second pixel.

In a possible implementation, when the pixel value of the third pixel and the pixel value of the fourth pixel are determined, a sum of the color difference signal Cr corresponding to the first pixel and the color difference signal Cb corresponding to the second pixel may be first determined, then ¼ of the sum is determined, and a difference value Ga between the average value Y and ¼ of the sum is determined. Finally, a sum of the difference value Ga and half of the difference value Dg is determined as the pixel value of the third pixel, and a difference value between the difference value Ga and half of the difference value Dg is determined as the pixel value of the fourth pixel. Processes of determining the pixel value of the third pixel and the pixel value of the fourth pixel may also be interchanged.

In a possible implementation, the color component of the first pixel is a first color component, the color component of the second pixel is a second color component, and the color components of the third pixel and the fourth pixel are third color components.

In a possible implementation, the first color component is an R color component, the second color component is a B color component, and the third color component is a G color component.

In a possible implementation, the first color component is an R color component, the second color component is a B color component, and the third color component is a Y' color component.

In a possible implementation, the first pixel, the second pixel, the third pixel, and the fourth pixel form a 2*2 image block in the first image.

In a possible implementation, the first image includes the first color component, the second color component, and the third color component. The first pixel, the second pixel, the third pixel, and the fourth pixel each have only one color component.

In a possible implementation, the third pixel and the fourth pixel are located in different rows and different columns in the 2*2 image block.

According to a third aspect, an image encoding apparatus is provided, where the apparatus has a function of implementing the first aspect and any possible implementation of the first aspect. The function may be implemented by hardware, or may be implemented by hardware by executing corresponding software. The hardware or the software includes one or more function modules corresponding to the foregoing function.

In a possible implementation, the apparatus includes a determining module and an output module. The determining module is configured to determine a color difference signal Cr corresponding to a first pixel based on a pixel value of the first pixel in a first image, and pixel values of a third pixel and a fourth pixel that are adjacent to the first pixel, determine a color difference signal Cb corresponding to a second pixel based on a pixel value of the second pixel in the first image, and the pixel values of the third pixel and the fourth pixel that are adjacent to the second pixel, where color components of the third pixel and the fourth pixel are the same, and color components of the first pixel, the second pixel, and the third pixel are different, determine an average value Co of the color difference signal Cr corresponding to the first pixel and the color difference signal Cb corresponding to the second pixel, and a difference value Cg between the color difference signal Cr corresponding to the first pixel and the color difference signal Cb corresponding to the second pixel, and determine a difference value Dg between the pixel values of the third pixel and the fourth pixel, and determine an average value Y of the pixel value of the first pixel, the pixel value of the second pixel, the pixel value of the third pixel, and the pixel value of the fourth pixel. The output module is configured to output the difference value Dg, the average value Y, the average value Co, and the difference value Cg.

In a possible implementation, when determining the color difference signal Cr corresponding to the first pixel based on the pixel value of the first pixel in the first image and the pixel values of the third pixel and the fourth pixel that are adjacent to the first pixel, the determining module is further configured to determine a difference value between the pixel value of the first pixel and an average value Ga as the color difference signal Cr corresponding to the first pixel, where the average value Ga is an average value of the third pixel and the fourth pixel.

In a possible implementation, when determining the color difference signal Cb corresponding to the second pixel based on the pixel value of the second pixel in the first image and the pixel values of the third pixel and the fourth pixel that are adjacent to the second pixel, the determining module is further configured to determine a difference value between the pixel value of the second pixel and the average value Ga as the color difference signal Cb corresponding to the second pixel, where the average value Ga is the average value of the third pixel and the fourth pixel.

In a possible implementation, the color component of the first pixel is a first color component, the color component of the second pixel is a second color component, and the color components of the third pixel and the fourth pixel are third color components.

In a possible implementation, the first color component is an R color component, the second color component is a B color component, and the third color component is a G color component.

In a possible implementation, the first color component is an R color component, the second color component is a B color component, and the third color component is a Y' color component.

In a possible implementation, the first pixel, the second pixel, the third pixel, and the fourth pixel form a 2*2 image block in the first image.

According to a fourth aspect, an image decoding apparatus is provided, where the apparatus has a function of implementing the second aspect and any possible implementation of the second aspect. The function may be implemented by hardware, or may be implemented by hardware by executing corresponding software. The hardware or the software includes one or more function modules corresponding to the foregoing function.

In a possible implementation, the apparatus includes a determining module and an output module. The determining module is configured to determine a color difference signal Cr corresponding to a first pixel and a color difference signal Cb corresponding to a second pixel based on an average value Co of the color difference signal Cr corresponding to the first pixel and the color difference signal Cb corresponding to the second pixel in a first image, and a difference value Cg between the color difference signal Cr corresponding to the first pixel and the color difference signal Cb corresponding to the second pixel, and determine a pixel value of the first pixel, a pixel value of the second pixel, a pixel value of a third pixel, and a pixel value of a fourth pixel based on the color difference signal Cr corresponding to the first pixel and the color difference signal Cb corresponding to the second pixel, a difference value Dg between the pixel values of the third pixel and the fourth pixel in the first image, and an average value Y of the pixel value of the first pixel, the pixel value of the second pixel, the pixel value of the third pixel, and the pixel value of the fourth pixel, where color components of the third pixel and the fourth pixel are the same, and color components of the first pixel, the second pixel, and the third pixel are different. The output module is configured to output the pixel value of the first pixel, the pixel value of the second pixel, the pixel value of the third pixel, and the pixel value of the fourth pixel.

In a possible implementation, a difference value between the average value Co and half of the difference value Cg is determined as the color difference signal Cr corresponding to the first pixel in the first image. A sum of the average value Co and half of the difference value Cg is determined as the color difference signal Cb corresponding to the second pixel in the first image. The average value Co is an average value of the color difference signal Cr corresponding to the first pixel and the color difference signal Cb corresponding to the second pixel, and the difference value Cg is a difference value between the color difference signal Cr corresponding to the first pixel and the color difference signal Cb corresponding to the second pixel.

In a possible implementation, when determining the pixel value of the first pixel and the pixel value of the second pixel, the determining module may be further configured to determine a sum of the color difference signal Cr corresponding to the first pixel and the color difference signal Cb corresponding to the second pixel, determine ¼ of the sum, and determine a difference value Ga between the average value Y and ¼ of the sum, and determine a sum of the difference value Ga and the color difference signal Cr corresponding to the first pixel as the pixel value of the first pixel, and determine a sum of the difference value Ga and the color difference signal Cb corresponding to the second pixel as the pixel value of the second pixel.

In a possible implementation, when determining the pixel value of the third pixel and the pixel value of the fourth pixel, the determining module may be further configured to determine a sum of the color difference signal Cr corresponding to the first pixel and the color difference signal Cb corresponding to the second pixel, determine ¼ of the sum, determine a difference value Ga between the average value Y and ¼ of the sum, and determine a sum of the difference value Ga and half of the difference value Dg as the pixel value of the third pixel, and determine a difference value between the difference value Ga and half of the difference value Dg as the pixel value of the fourth pixel. Processes of determining the pixel value of the third pixel and the pixel value of the fourth pixel may also be interchanged.

In a possible implementation, the color component of the first pixel is a first color component, the color component of the second pixel is a second color component, and the color components of the third pixel and the fourth pixel are third color components.

In a possible implementation, the first color component is an R color component, the second color component is a B color component, and the third color component is a G color component.

In a possible implementation, the first color component is an R color component, the second color component is a B color component, and the third color component is a Y' color component.

In a possible implementation, the first pixel, the second pixel, the third pixel, and the fourth pixel form a 2*2 image block in the first image.

According to a fifth aspect, an image encoding apparatus is provided, where the apparatus may be the image encoding apparatus in the foregoing method embodiments, or may be a chip disposed in the image encoding apparatus. The apparatus includes a transceiver and a processor, and optionally, further includes a memory. The memory is configured to store a computer program or instructions, and the processor is separately coupled to the memory and the transceiver. When the processor executes the computer program or the instructions, the apparatus performs, by using the transceiver, the method performed by the image encoding apparatus in the first aspect and any possible implementation of the first aspect.

According to a sixth aspect, an image decoding apparatus is provided, where the apparatus may be the image decoding apparatus in the foregoing method embodiments, or may be a chip disposed in the image decoding apparatus. The apparatus includes a transceiver and a processor, and optionally, further includes a memory. The memory is configured to store a computer program or instructions, and the processor is separately coupled to the memory and the transceiver. When the processor executes the computer program or the instructions, the apparatus performs, by using the transceiver, the method performed by the image decoding apparatus in the second aspect and any possible implementation of the second aspect.

According to a seventh aspect, a computer program product is provided, where the computer program product includes computer program code. When the computer program code runs on a computer, the computer performs the method performed by the image encoding apparatus in the first aspect and any possible implementation of the first aspect.

According to an eighth aspect, a computer program product is provided, where the computer program product includes computer program code. When the computer program code runs on a computer, the computer performs the method performed by the image decoding apparatus in the second aspect and any possible implementation of the second aspect.

According to a ninth aspect, this application provides a chip system, where the chip system includes a processor and a memory. The processor and the memory are electrically coupled. The memory is configured to store computer program instructions. The processor is configured to execute some or all computer program instructions in the memory, and when the some or all computer program instructions are executed, is configured to implement a function of the image encoding apparatus in the method of the first aspect and any possible implementation of the first aspect.

In a possible design, the chip system may further include a transceiver, and the transceiver is configured to send a signal processed by the processor, or receive a signal input to the processor. The chip system may include a chip, or may include a chip and another discrete device.

According to a tenth aspect, this application provides a chip system, where the chip system includes a processor and a memory. The processor and the memory are electrically coupled. The memory is configured to store computer program instructions. The processor is configured to execute some or all computer program instructions in the memory, and when the some or all computer program instructions are executed, is configured to implement a function of the image decoding apparatus in the method of the second aspect and any possible implementation of the second aspect.

In a possible design, the chip system may further include a transceiver, and the transceiver is configured to send a signal processed by the processor, or receive a signal input to the processor. The chip system may include a chip, or may include a chip and another discrete device.

According to an eleventh aspect, a computer readable storage medium is provided, where the computer readable storage medium stores a computer program. When the computer program is run, the method performed by the image encoding apparatus in the first aspect and any possible implementation of the first aspect is performed.

According to a twelfth aspect, a computer readable storage medium is provided, where the computer readable storage medium stores a computer program. When the computer program is run, the method performed by the image decoding apparatus in the first aspect and any possible implementation of the first aspect is performed.

According to a thirteenth aspect, an image encoding and decoding system is provided. The system includes the image encoding apparatus performing the method in the first aspect and any possible implementation of the first aspect, and the image decoding apparatus performing the method in the second aspect and any possible implementation of the second aspect.

BRIEF DESCRIPTION OF DRAWINGS

FIG. 2A is a raw image in an RGGB format applicable to an embodiment of this application;

FIG. 2B is a raw image in a GRBG format applicable to an embodiment of this application;

FIG. 3A is a raw image in an RYYB format applicable to an embodiment of this application;

FIG. 3B is a raw image in a YRBY format applicable to an embodiment of this application;

DESCRIPTION OF EMBODIMENTS

The following describes in detail embodiments of this application with reference to accompanying drawings.

Before embodiments of this application are described, some terms in the embodiments of this application are first explained, so as to facilitate understanding by a person skilled in the art.

(1) Image encoding is also referred to as image compression, which is a technology in which an image or information included in an image is represented by using a relatively small quantity of bits under a condition of meeting specific quality (a requirement of a signal-to-noise ratio or a subjective evaluation score). Image decoding is an inverse process of image encoding.

(2) Raw originally means "unprocessed", and a raw image may be raw data used for converting a captured light source signal into a digital signal by a complementary metal-oxide-semiconductor (CMOS) or charge-coupled device (CCD) image sensor. A raw format is an unprocessed and uncompressed format. The raw may be conceptualized as "raw image encoded data" or more vividly referred to as "a digital negative film".

The term "and/or" describes an association relationship for describing associated objects and represents that three relationships may exist. For example, A and/or B may represent the following three cases: only A exists, both A and B exist, and only B exists. The character "/" usually indicates an "or" relationship between associated objects.

"A plurality of" in this application means two or more.

In description of this application, terms such as "first" and "second" are merely used for distinguishing and description, but should not be understood as indicating or implying relative importance, or should not be understood as indicating or implying a sequence.

In addition, the word "example" in embodiments of this application is used to represent giving an example, an illustration, or a description. Any embodiment or implementation described herein as "an example" in this application should not be construed as being more preferred or advantageous than other embodiments or implementations. In particular, the term "example" is intended to present a concept in a specific manner.

For ease of understanding embodiments of this application, the following describes application scenarios in this application. A network architecture and service scenarios described in the embodiments of this application are used to describe the technical solutions in the embodiments of this application more clearly, and do not constitute a limitation on the technical solutions provided in the embodiments of this application. It may be learned by a person of ordinary skill in the art that, with emergence of a new service scenario, the technical solutions provided in the embodiments of this application are also applicable to similar technical issues.

Figure 1A:
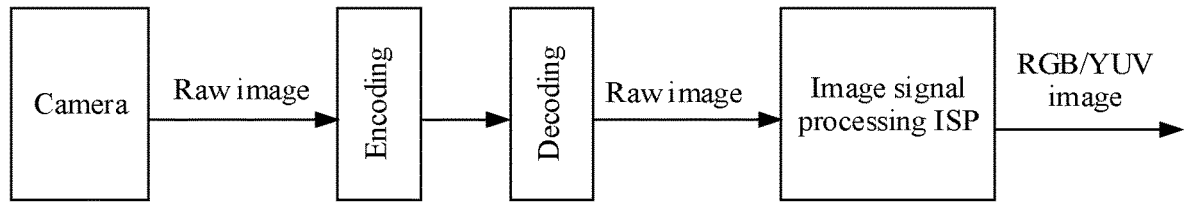
FIG. 1A is a schematic flowchart of image processing applicable to an embodiment of this application.

As shown in FIG. 1A, after acquiring a raw image, a camera needs to transmit the raw image, and image signal processing (ISP) is performed on the raw image to obtain an image in an red, green, and blue (RGB) format or an image in a luma, blue projection, and red projection (YUV) format for displaying. If the camera outputs a raw image with 4000 (4K) ultra-high-definition (UHD) 30 fps 16 bit depth (such as a Bayer raw image), a bandwidth requirement of the image is up to 4 gigabits per second (Gbps) (4K*2 k*30*16). To alleviate network transmission pressure, a compression (image encoding) method is usually used to reduce the bandwidth requirement, and a new high-definition or ultra-high-definition video service can be performed without a need of upgrading an existing network infrastructure.

Figure 1B:
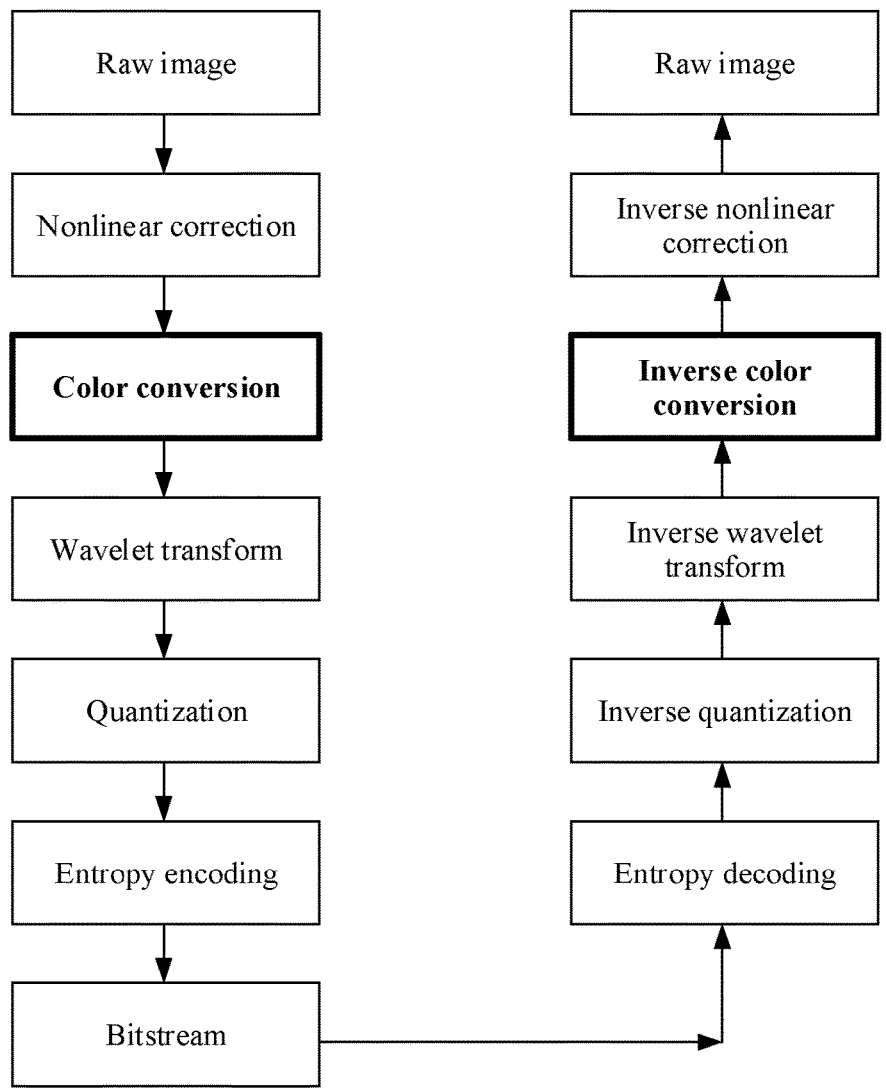
FIG. 1B is a schematic flowchart of image encoding and decoding applicable to an embodiment of this application.

As shown in FIG. 1B, a schematic diagram of an image encoding and decoding process is provided. An image encoding process, for example, includes nonlinear correction, color conversion, wavelet transform, quantization, and entropy encoding. After these processes, a bitstream may be formed. An image decoding process is an inverse process of the image encoding process, and includes, for example, entropy decoding, inverse quantization, inverse wavelet transform, inverse color conversion, and inverse nonlinear correction. This application mainly focuses on a color conversion process in image encoding and an inverse color conversion process in image decoding.

In an application scenario with a relatively high real-time quality requirement, for example, an application scenario for self-driving, a time delay introduced by image encoding is relatively sensitive on the premise of ensuring encoding performance. Based on this, in an image encoding process, how to perform color conversion to remove redundant information between color signals, improve encoding and compression performance, and reduce computation complexity is a technical problem that needs to be resolved.

In this application, a color conversion manner in an image encoding process and an inverse color conversion manner in an image decoding process are presented, to resolve a problem about how to perform color conversion to remove redundant information between color signals, improve encoding and compression performance, and reduce computation complexity.

The following describes the solution in detail with reference to the accompanying drawings. Features or content identified by dashed lines in the accompanying drawings may be understood as an optional operation or an optional structure of the embodiments of this application.

In this application, a raw image includes three color components. Each pixel in the raw image has only one color component, and a value of the color component may be equal to a pixel value of the pixel. In an example, the three color components are respectively an R color component, a B color component, and a G color component. In another example, the three color components are respectively an R color component, a B color component, and a Y' color component. Color components included in the raw image are related to a color filter in a camera.

FIG. 2A shows an example of a raw image whose pixel color filter array (CFA) format is a red, green, green, and blue (RGGB) format, that is, a color component of a pixel in the first row and the first column of the raw image is R, a color component of a pixel in the first row and the second column is G, a color component of a pixel in the second row and the first column is G, and a color component of a pixel in the second row and the second column is B. Pixels of these four color components cyclically appear.

FIG. 2B shows an example of a raw image whose pixel CFA format is a green, red, blue, and green (GRBG) format, that is, a color component of a pixel in the first row and the first column of the raw image is G, a color component of a pixel in the first row and the second column is R, a color component of a pixel in the second row and the first column is B, and a color component of a pixel in the second row and the second column is G. Pixels of these four color components cyclically appear.

The pixels of the G color component in FIG. 2A and FIG. 2B may alternatively be replaced with pixels of a Y' color component. For details, refer to FIG. 3A and FIG. 3B. In FIG. 3A and FIG. 3B, Y is used to replace Y'. The Y' color component is actually a Y color component, and Y' is merely used to distinguish from the following average value Y.

Figure 4:
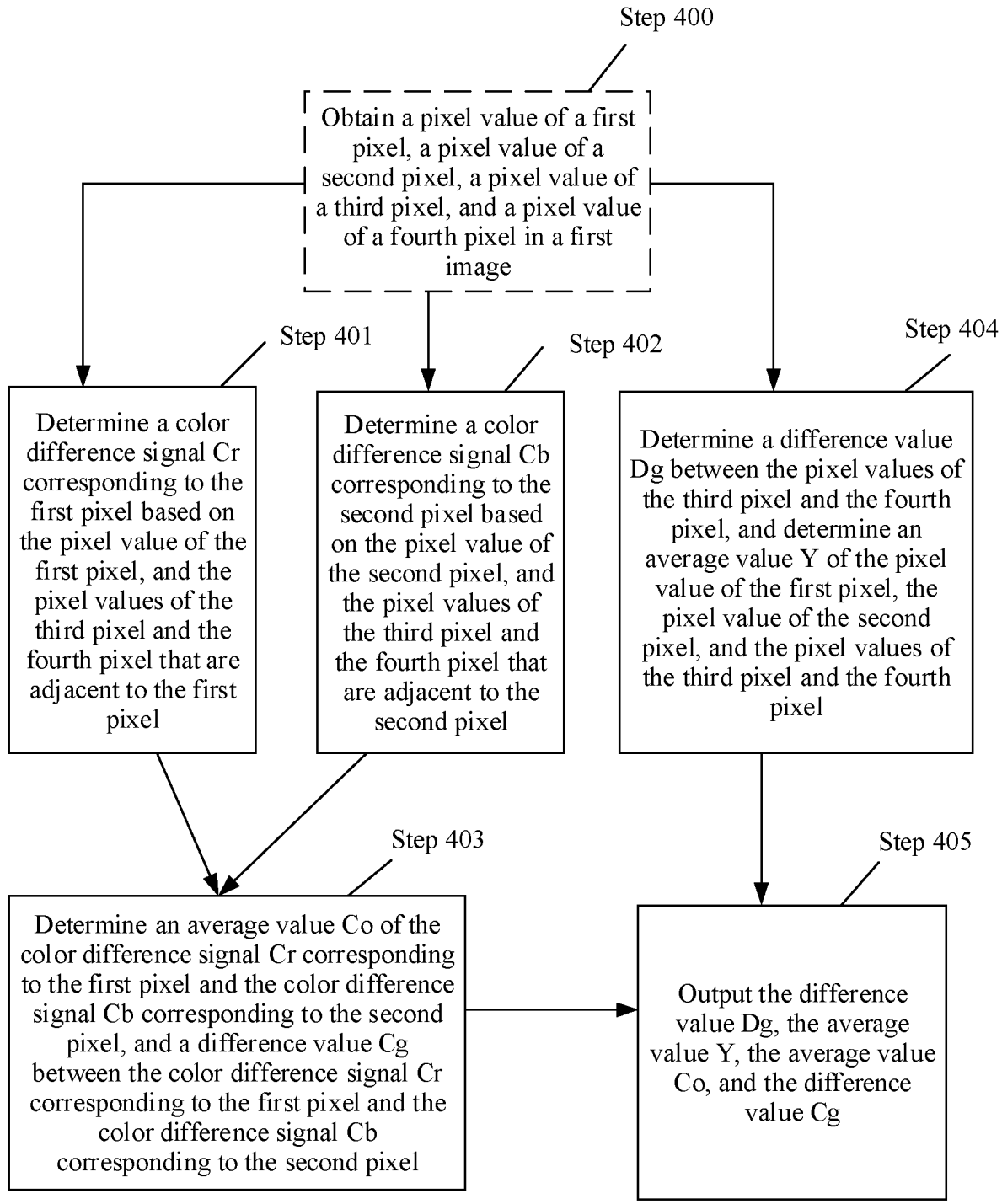
FIG. 4 is a schematic diagram of a color conversion process during image encoding applicable to an embodiment of this application.

Next, as shown in FIG. 4, a schematic diagram of a color conversion process in an image encoding process is provided. Taking a first image as an example, color components of a first pixel, a second pixel, and a third pixel in the first image are different, and color components of the third pixel and a fourth pixel are the same. The third pixel is adjacent to the first pixel, the fourth pixel is adjacent to the first pixel, the third pixel is adjacent to the second pixel, and the fourth pixel is adjacent to the second pixel. The first image may be the raw image in the foregoing example of FIG. 2A, FIG. 2B, FIG. 3A, or FIG. 3B.

Step 400: An image encoding apparatus obtains a pixel value of the first pixel, a pixel value of the second pixel, a pixel value of the third pixel, and a pixel value of the fourth pixel in the first image.

The color component of the first pixel is a first color component, the color component of the second pixel is a second color component, and the color components of the third pixel and the fourth pixel are third color components.

In an example, the first color component is an R color component, the second color component is a B color component, and the third color component is a G color component. As shown in FIG. 2A and FIG. 2B, to be specific, the first pixel is a pixel of the R color component, the second pixel is a pixel of the B color component, and the third pixel and the fourth pixel are pixels of the G color component. In an example, the first color component is an R color component, the second color component is a B color component, and the third color component is a Y' color component. As shown in FIG. 3A and FIG. 3B, to be specific, the first pixel is a pixel of the R color component, the second pixel is a pixel of the B color component, and the third pixel and the fourth pixel are pixels of the Y' color component. A color component of a pixel is related to a color filter of a camera.

In an example, the first pixel, the second pixel, the third pixel, and the fourth pixel form a 2*2 image block in the first image. Further, the third pixel and the fourth pixel are located in different rows and different columns in the 2*2 image block.

When the first image is an image in an RGGB format or an image in an RYYG format, if coordinates of the first pixel (R color component) in the first image are (i, j), that is, the first pixel is located in an $i^{th}$ row and a $j^{th}$ column in the first image, coordinates of the second pixel (B color component) in the first image are (i−1, j−1), and coordinates of the third pixel (G or Y' color component) and the fourth pixel (G or Y' color component) in the first image are (i, j+1) and (i+1, j) respectively. The coordinates of the third pixel and the fourth pixel can be interchanged.

When the first image is an image in a GRBG format or an image in a YRBY format, if coordinates of the first pixel (R color component) in the first image are (i, j), that is, the first pixel is located in an $i^{th}$ row and a $j^{th}$ column in the first image, coordinates of the second pixel (B color component) in the first image are (i−1, j+1), and coordinates of the third pixel (G or Y' color component) and the fourth pixel (G or Y' color component) in the first image are (i, j−1) and (i+1, j) respectively. The coordinates of the third pixel and the fourth pixel can be interchanged.

Step 401: The image encoding apparatus determines a color difference signal Cr corresponding to the first pixel based on the pixel value of the first pixel in the first image and the pixel values of the third pixel and the fourth pixel that are adjacent to the first pixel.

In an example, when the color difference signal Cr corresponding to the first pixel is determined, a difference value between the pixel value of the first pixel and an average value Ga may be determined as the color difference signal Cr corresponding to the first pixel, where the average value Ga is an average value of the third pixel and the fourth pixel.

For example, Ga=(G1+G2)/2 and Cr=R−Ga or Cr=Ga−R. G1 and G2 are the pixel value of the third pixel and the pixel value of the fourth pixel, and R is the pixel value of the first pixel.

For example, the pixel value of the first pixel is 170, the pixel value of the third pixel is 200, and the pixel value of the fourth pixel is 180. Then, the color difference signal corresponding to the first pixel is Cr=170−(200+180)/2=−20 or Cr=(200+180)/2−170=20.

Step 402: The image encoding apparatus determines a color difference signal Cb corresponding to the second pixel based on the pixel value of the second pixel in the first image and the pixel values of the third pixel and the fourth pixel that are adjacent to the second pixel.

In an example, when the color difference signal Cb corresponding to the second pixel is determined, a difference value between the pixel value of the second pixel and the average value Ga may be determined as the color difference signal Cb corresponding to the second pixel, where the average value Ga is the average value of the third pixel and the fourth pixel.

For example, Cb=B−Ga or Cb=Ga−B, where B is the pixel value of the second pixel.

For example, the pixel value of the second pixel is 175, the pixel value of the third pixel is 200, and the pixel value of the fourth pixel is 180. Then, the color difference signal corresponding to the second pixel is Cb=175−(200+180)/2=−15 or Cb=(200+180)/2−175=15.

It should be noted that when the color difference signal Cb and the color difference signal Cr are determined, a consistent subtraction sequence is used as far as possible. For example, if the color difference signal Cr is obtained by subtracting the average value Ga from the pixel value of the first pixel, the color difference signal Cb is obtained by subtracting the average value Ga from the pixel value of the second pixel. For another example, if the color difference signal Cr is obtained by subtracting the pixel value of the first pixel from the average value Ga, the color difference signal Cb is obtained by subtracting the pixel value of the second pixel from the average value Ga.

A sequence of step 401 and step 402 is not limited.

Step 403: The image encoding apparatus determines an average value Co of the color difference signal Cr corresponding to the first pixel and the color difference signal Cb corresponding to the second pixel and a difference value Cg between the color difference signal Cr corresponding to the first pixel and the color difference signal Cb corresponding to the second pixel.

For example, Co=(Cb+Cr)/2 and Cg=Cb−Cr=B−R, or Cg=Cr−Cb=R−B.

For example, the color difference signal Cr is 20 and the color difference signal Cb is 15. Then, the average value Co=(20+15)/2=17.5, and the difference value Cg=20−15=5 or 15−20=−5.

A binary number of 20 is 10100, occupying 5 bits. A binary number of 15 is 1111, occupying 4 bits. A binary number of 5 is 101, occupying 3 bits. Whether a value of a color difference signal is positive or negative may be mutually determined by an encoding apparatus and a decoding apparatus.

The difference value Cg between the color difference signal Cb and the color difference signal Cr is smaller than the color difference signal Cb and the color difference signal Cr, so that the difference value Cg can occupy a relatively small quantity of bits, a transmission bandwidth is reduced, and encoding performance is improved.

Step 404: The image encoding apparatus determines a difference value Dg between the pixel values of the third pixel and the fourth pixel, and determines an average value Y of the pixel value of the first pixel, the pixel value of the second pixel, the pixel value of the third pixel, and the pixel value of the fourth pixel.

For example, Dg=G1−G2, or Dg=G2−G1, Y=(R+G1+G2+B)/4, the pixel value of the third pixel is 200, and the pixel value of the fourth pixel is 180. Then, the difference value Dg=200−180=20, or the difference value Dg=180−200=−20, and the average value Y=(170+175+200+180)/4=181.25.

A sequence of step 404 and any step in step 401 to step 403 is not limited.

Step 405: The image encoding apparatus outputs the difference value Dg, the average value Y, the average value Co, and the difference value Cg.

The "output" herein may be output to another device or another apparatus, or may be output to a next process of a color conversion process, for example, output to a wavelet transform process.

The difference value Cg between the color difference signal Cb and the color difference signal Cr is determined, and the difference value Cg is smaller than values of the color difference signal Cb and the color difference signal Cr, so that a relatively small quantity of bits can be occupied, a transmission bandwidth is reduced, and encoding performance is improved. The average value Co of the color difference signal Cb and the color difference signal Cr is determined to counteract noise of the color difference signal Cb and the color difference signal Cr. When the first image is a raw image, the color difference signal Cb and the color difference signal Cr have redundant information. The difference value Cg and the average value Co are calculated to remove the redundant information, thereby reducing computation complexity.

Figure 5:
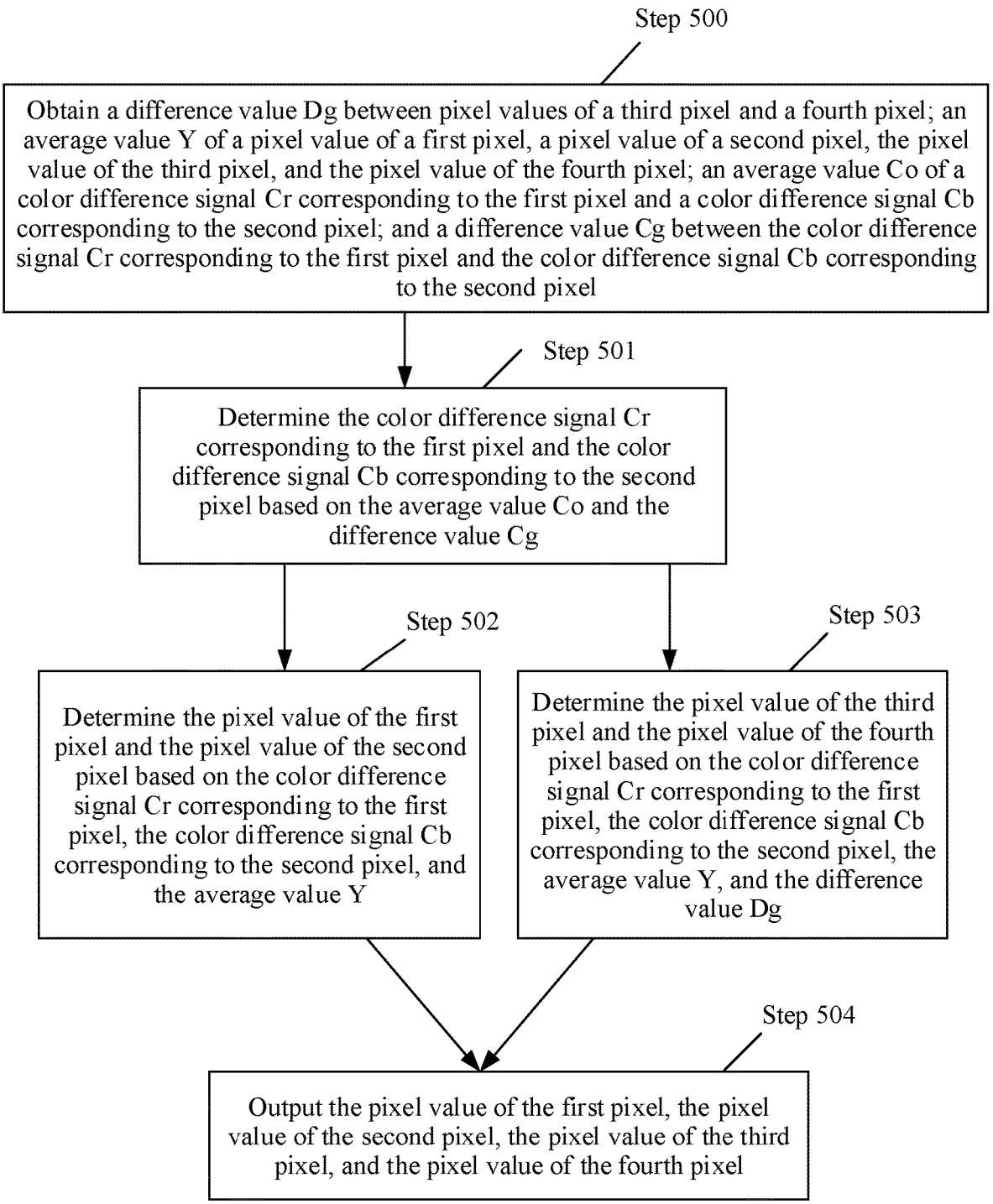
FIG. 5 is a schematic diagram of an inverse color conversion process during image decoding applicable to an embodiment of this application.

Next, as shown in FIG. 5, a schematic diagram of an inverse color conversion process in an image decoding process is provided. Color components of a first pixel, a second pixel, and a third pixel in a first image are different, and a related limitation of the third pixel and a fourth pixel is the same as that of FIG. 4, and repeated content is no longer limited.

Optionally, step 500: An image decoding apparatus obtains a difference value Dg between pixel values of the third pixel and the fourth pixel, an average value Y of a pixel value of the first pixel, a pixel value of the second pixel, the pixel value of the third pixel, and the pixel value of the fourth pixel, an average value Co of a color difference signal Cr corresponding to the first pixel and a color difference signal Cb corresponding to the second pixel, and a difference value Cg between the color difference signal Cr corresponding to the first pixel and the color difference signal Cb corresponding to the second pixel.

Step 501: The image decoding apparatus determines the color difference signal Cr corresponding to the first pixel and the color difference signal Cb corresponding to the second pixel based on the average value Co and the difference value Cg.

Further, a difference value between the average value Co and half of the difference value Cg is determined as the color difference signal Cr corresponding to the first pixel in the first image. A sum of the average value Co and half of the difference value Cg is determined as the color difference signal Cb corresponding to the second pixel in the first image. The color difference signal Cb=Co+Cg/2, and the color difference signal Cr=Co−Cg/2.

Next, the pixel value of the first pixel, the pixel value of the second pixel, the pixel value of the third pixel, and the pixel value of the fourth pixel are determined based on the color difference signal Cr corresponding to the first pixel and the color difference signal Cb corresponding to the second pixel, the difference value Dg between the pixel values of the third pixel and the fourth pixel in the first image, and the average value Y of the pixel value of the first pixel, the pixel value of the second pixel, the pixel value of the third pixel, and the pixel value of the fourth pixel.

Step 502: The image decoding apparatus determines the pixel value of the first pixel and the pixel value of the second pixel based on the color difference signal Cr corresponding to the first pixel, the color difference signal Cb corresponding to the second pixel and the average value Y.

Further, ¼ of a sum of the color difference signal Cr corresponding to the first pixel and the color difference signal Cb corresponding to the second pixel is determined, and a difference value Ga between the average value Y and ¼ of the sum is determined, that is, Ga=Y−(Cb+Cr)/4.

A sum of the difference value Ga and the color difference signal Cr corresponding to the first pixel is determined as the pixel value of the first pixel, and the pixel value of the first pixel is R=Ga+Cr.

A sum of the difference value Ga and the color difference signal Cb corresponding to the second pixel is determined as the pixel value of the second pixel, and the pixel value of the second pixel is B=Ga+Cb.

A sequence of determining the pixel value of the first pixel and the pixel value of the second pixel in step 502 is not limited.

Step 503: The image decoding apparatus determines the pixel value of the third pixel and the pixel value of the fourth pixel based on the color difference signal Cr corresponding to the first pixel, the color difference signal Cb corresponding to the second pixel, the average value Y, and the difference value Dg.

Further, ¼ of the sum of the color difference signal Cr corresponding to the first pixel and the color difference signal Cb corresponding to the second pixel is determined, and the difference value Ga between the average value Y and ¼ of the sum is determined, that is, Ga=Y−(Cb+Cr)/4.

A sum of the difference value Ga and half of the difference value Dg is determined as the pixel value of the third pixel, and a difference value between the difference value Ga and half of the difference value Dg is determined as the pixel value of the fourth pixel. The pixel value of the third pixel is G1=Ga+Dg/2, and the pixel value of the fourth pixel is G2=Ga−Dg/2. Processes of determining the pixel value of the third pixel and the pixel value of the fourth pixel can be interchanged, that is, the pixel value of the fourth pixel is G2=Ga+Dg/2, and the pixel value of the third pixel is G1=Ga−Dg/2.

A sequence of determining the pixel value of the third pixel and the pixel value of the fourth pixel in step 503 is not limited.

A sequence of step 502 and step 503 is not limited.

In both step 503 and step 502, a pixel value of each pixel is determined based on Ga=Y−(Cb+Cr)/4. In an example, the image decoding apparatus may alternatively determine an intermediate variable Ga (actually, Ga is an average value of the pixel value of the first pixel and the pixel value of the second pixel) first based on Ga=Y−(Cb+Cr)/4, and then determine the pixel value of each pixel based on Ga. A sequence of determining the pixel value of the first pixel, the pixel value of the second pixel, the pixel value of the third pixel, and the pixel value of the fourth pixel is not limited on the basis that Ga is determined.

Step 504: Output the pixel value of the first pixel, the pixel value of the second pixel, the pixel value of the third pixel, and the pixel value of the fourth pixel.

The "output" herein may be output to another device or another apparatus, or may be output to a next process of an inverse color conversion process, for example, output to an inverse nonlinear correction process.

Figure 6:
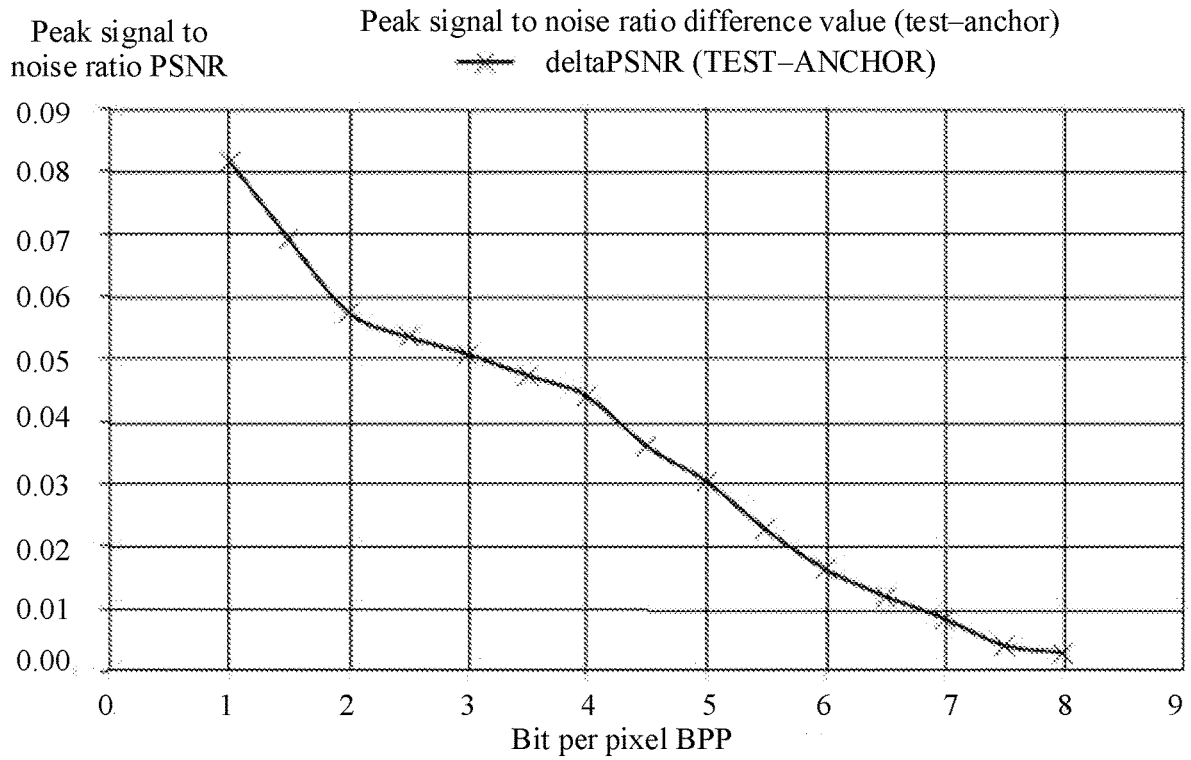
FIG. 6 is a schematic diagram of a simulation effect during image encoding and decoding applicable to an embodiment of this application.

In a simulation test result shown in FIG. 6, a horizontal axis is bit per pixel (bpp) allocated during encoding, which is equivalent to a bit rate value, and a vertical axis is a peak signal-to-noise ratio (PSNR), the PSNR is an image quality measurement indicator, and a larger value of the PSNR is better. A curve in FIG. 6 represents a difference value of the PSNR. The difference value of the PSNR is a difference value between a PSNR of an encoding scheme of outputting a difference value Dg, an average value Y, an average value Co, and a difference value Cg in this application, and a PSNR of an encoding scheme of outputting the difference value Dg, the average value Y, a color difference signal Cb, and a color difference signal Cr (the average value Co and the difference value Cg are not calculated). When the difference value of the PSNR is a negative number, it indicates that performance is lost, and when the difference value of the PSNR is a positive number, it indicates that performance is improved. As shown in FIG. 6, it can be seen that performance is improved within an entire test bit rate range.

The foregoing is merely described by using a 2*2 image block in the first image as an example. If the first image includes a plurality of 2*2 image blocks described above, color conversion and inverse color conversion may be performed on each 2*2 image block in the foregoing manner. It should be noted that if a quantity of rows and a quantity of columns of the first image are not integral multiples of 2, the quantity of rows or the quantity of columns may be supplemented before color conversion is performed, or the last row and column are filtered out, and no color conversion or inverse color conversion is performed on the last row and column.

The foregoing describes the image encoding method and the image decoding method in embodiments of this application. The following describes an image encoding apparatus in an embodiment of this application. The method and the apparatus are based on a same concept. Because the method and the apparatus have similar problem-resolving principles, for implementations of the apparatus and the method, refer to each other, and no repeated description is provided.

Figure 7:
FIG. 7 is a structural diagram of an image encoding apparatus applicable to an embodiment of this application.

Based on a same technical concept as the foregoing image encoding method, as shown in FIG. 7, an image encoding apparatus 700 is provided. The apparatus 700 can perform each step performed by the image encoding apparatus in the foregoing method in FIG. 4. The apparatus 700 may be a device or a chip in a device. The apparatus 700 may include a determining module 710 and an output module 720.

In a possible implementation, the determining module 710 is configured to determine a color difference signal Cr corresponding to a first pixel based on a pixel value of the first pixel in a first image, and pixel values of a third pixel and a fourth pixel that are adjacent to the first pixel, determine a color difference signal Cb corresponding to a second pixel based on a pixel value of the second pixel in the first image, and the pixel values of the third pixel and the fourth pixel that are adjacent to the second pixel, where color components of the third pixel and the fourth pixel are the same, and color components of the first pixel, the second pixel, and the third pixel are different, determine an average value Co of the color difference signal Cr corresponding to the first pixel and the color difference signal Cb corresponding to the second pixel, and a difference value Cg between the color difference signal Cr corresponding to the first pixel and the color difference signal Cb corresponding to the second pixel, and determine a difference value Dg between the pixel values of the third pixel and the fourth pixel, and determine an average value Y of the pixel value of the first pixel, the pixel value of the second pixel, the pixel value of the third pixel, and the pixel value of the fourth pixel.

The output module 720 is configured to output the difference value Dg, the average value Y, the average value Co, and the difference value Cg.

In a possible implementation, when determining the color difference signal Cr corresponding to the first pixel based on the pixel value of the first pixel in the first image, and the pixel values of the third pixel and the fourth pixel that are adjacent to the first pixel, the determining module 710 is further configured to determine a difference value between the pixel value of the first pixel and an average value Ga as the color difference signal Cr corresponding to the first pixel, where the average value Ga is an average value of the third pixel and the fourth pixel.

In a possible implementation, when determining the color difference signal Cb corresponding to the second pixel based on the pixel value of the second pixel in the first image, and the pixel values of the third pixel and the fourth pixel that are adjacent to the second pixel, the determining module 710 is further configured to determine a difference value between the pixel value of the second pixel and the average value Ga as the color difference signal Cb corresponding to the second pixel, where the average value Ga is the average value of the third pixel and the fourth pixel.

Figure 8:
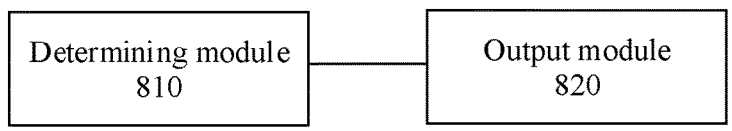
FIG. 8 is a structural diagram of an image decoding apparatus applicable to an embodiment of this application.

Based on a same technical concept as the foregoing image decoding method, as shown in FIG. 8, an image decoding apparatus 800 is provided. The apparatus 800 can perform each step performed by the image decoding apparatus in the foregoing method in FIG. 5. The apparatus 800 may be a device, or may be a chip applied to a device. The apparatus 800 may include a determining module 810 and an output module 820.

In a possible implementation, the determining module 810 is configured to determine a color difference signal Cr corresponding to a first pixel and a color difference signal Cb corresponding to a second pixel based on an average value Co of the color difference signal Cr corresponding to the first pixel and the color difference signal Cb corresponding to the second pixel in a first image, and a difference value Cg between the color difference signal Cr corresponding to the first pixel and the color difference signal Cb corresponding to the second pixel, and determine a pixel value of the first pixel, a pixel value of the second pixel, a pixel value of a third pixel, and a pixel value of a fourth pixel based on the color difference signal Cr corresponding to the first pixel and the color difference signal Cb corresponding to the second pixel, a difference value Dg between the pixel values of the third pixel and the fourth pixel in the first image, and an average value Y of the pixel value of the first pixel, the pixel value of the second pixel, the pixel value of the third pixel, and the pixel value of the fourth pixel. Color components of the third pixel and the fourth pixel are the same, and color components of the first pixel, the second pixel, and the third pixel are different.

The output module 820 is configured to output the pixel value of the first pixel, the pixel value of the second pixel, the pixel value of the third pixel, and the pixel value of the fourth pixel.

In a possible implementation, a difference value between the average value Co and half of the difference value Cg is determined as the color difference signal Cr corresponding to the first pixel in the first image. A sum of the average value Co and half of the difference value Cg is determined as the color difference signal Cb corresponding to the second pixel in the first image.

In a possible implementation, when determining the pixel value of the first pixel and the pixel value of the second pixel, the determining module 810 may be further configured to determine a sum of the color difference signal Cr corresponding to the first pixel and the color difference signal Cb corresponding to the second pixel, determine ¼ of the sum, determine a difference value Ga between the average value Y and ¼ of the sum, and determine a sum of the difference value Ga and the color difference signal Cr corresponding to the first pixel as the pixel value of the first pixel, and determine a sum of the difference value Ga and the color difference signal Cb corresponding to the second pixel as the pixel value of the second pixel.

In a possible implementation, when determining the pixel value of the third pixel and the pixel value of the fourth pixel, the determining module 810 may be further configured to determine a sum of the color difference signal Cr corresponding to the first pixel and the color difference signal Cb corresponding to the second pixel, determine ¼ of the sum, determine a difference value Ga between the average value Y and ¼ of the sum, and determine a sum of the difference value Ga and half of the difference value Dg as the pixel value of the third pixel, and determine a difference value between the difference value Ga and half of the difference value Dg as the pixel value of the fourth pixel. Processes of determining the pixel value of the third pixel and the pixel value of the fourth pixel may also be interchanged.

Figure 9:
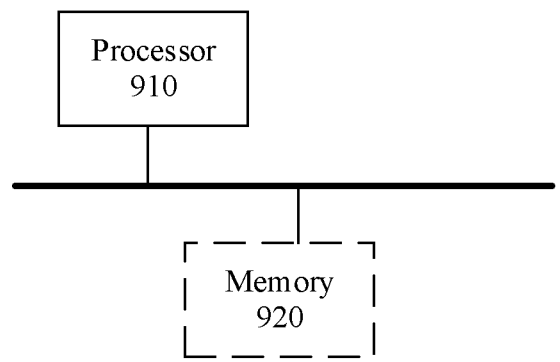
FIG. 9 is a structural diagram of an image encoding apparatus applicable to an embodiment of this application.

FIG. 9 is a schematic block diagram of an apparatus 900 according to an embodiment of this application. It should be understood that the apparatus 900 can perform each step performed by the image encoding apparatus in the foregoing method in FIG. 4. The apparatus 900 includes a processor 910, and optionally, further includes a memory 920. The processor 910 and the memory 920 are electrically coupled.

For example, the memory 920 is configured to store a computer program. The processor 910 may be configured to invoke the computer program or instructions stored in the memory to perform the foregoing image encoding method.

In a possible implementation, the processor 910 is configured to determine a color difference signal Cr corresponding to a first pixel based on a pixel value of the first pixel in a first image, and pixel values of a third pixel and a fourth pixel that are adjacent to the first pixel, determine a color difference signal Cb corresponding to a second pixel based on a pixel value of the second pixel in the first image, and the pixel values of the third pixel and the fourth pixel that are adjacent to the second pixel, where color components of the third pixel and the fourth pixel are the same, and color components of the first pixel, the second pixel, and the third pixel are different, determine an average value Co of the color difference signal Cr corresponding to the first pixel and the color difference signal Cb corresponding to the second pixel, and a difference value Cg between the color difference signal Cr corresponding to the first pixel and the color difference signal Cb corresponding to the second pixel, determine a difference value Dg between the pixel values of the third pixel and the fourth pixel, and determine an average value Y of the pixel value of the first pixel, the pixel value of the second pixel, the pixel value of the third pixel, and the pixel value of the fourth pixel, and output the difference value Dg, the average value Y, the average value Co, and the difference value Cg.

In a possible implementation, when determining the color difference signal Cr corresponding to the first pixel based on the pixel value of the first pixel in the first image, and the pixel values of the third pixel and the fourth pixel that are adjacent to the first pixel, the processor 910 is further configured to determine a difference value between the pixel value of the first pixel and an average value Ga as the color difference signal Cr corresponding to the first pixel, where the average value Ga is an average value of the third pixel and the fourth pixel.

In a possible implementation, when determining the color difference signal Cb corresponding to the second pixel based on the pixel value of the second pixel in the first image, and the pixel values of the third pixel and the fourth pixel that are adjacent to the second pixel, the processor 910 is further configured to determine a difference value between the pixel value of the second pixel and the average value Ga as the color difference signal Cb corresponding to the second pixel, where the average value Ga is the average value of the third pixel and the fourth pixel.

Figure 10:
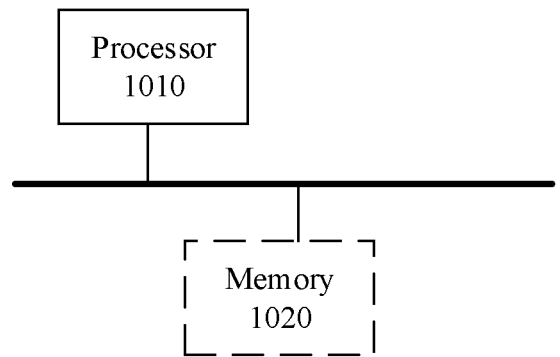
FIG. 10 is a structural diagram of an image decoding apparatus applicable to an embodiment of this application.

FIG. 10 is a schematic block diagram of an apparatus 1000 according to an embodiment of this application. It should be understood that the apparatus 1000 can perform each step performed by the image decoding apparatus in the foregoing method in FIG. 5. The apparatus 1000 includes a processor 1010, and optionally, further includes a memory 1020. The processor 1010 and the memory 1020 are electrically coupled.

For example, the memory 1020 is configured to store a computer program. The processor 1010 may be configured to invoke the computer program or instructions stored in the memory to perform the foregoing image decoding method.

In a possible implementation, the processor 1010 is configured to determine a color difference signal Cr corresponding to a first pixel and a color difference signal Cb corresponding to a second pixel based on an average value Co of the color difference signal Cr corresponding to the first pixel and the color difference signal Cb corresponding to the second pixel in a first image, and a difference value Cg between the color difference signal Cr corresponding to the first pixel and the color difference signal Cb corresponding to the second pixel, determine a pixel value of the first pixel, a pixel value of the second pixel, a pixel value of a third pixel, and a pixel value of a fourth pixel based on the color difference signal Cr corresponding to the first pixel and the color difference signal Cb corresponding to the second pixel, a difference value Dg between the pixel values of the third pixel and the fourth pixel in the first image, and an average value Y of the pixel value of the first pixel, the pixel value of the second pixel, the pixel value of the third pixel, and the pixel value of the fourth pixel, where color components of the third pixel and the fourth pixel are the same, and color components of the first pixel, the second pixel, and the third pixel are different, and output the pixel value of the first pixel, the pixel value of the second pixel, the pixel value of the third pixel, and the pixel value of the fourth pixel.

In a possible implementation, the processor 1010 is further configured to determine a difference value between the average value Co and half of the difference value Cg as the color difference signal Cr corresponding to the first pixel in the first image, and determine a sum of the average value Co and half of the difference value Cg as the color difference signal Cb corresponding to the second pixel in the first image.

In a possible implementation, when determining the pixel value of the first pixel and the pixel value of the second pixel, the processor 1010 may be further configured to determine a sum of the color difference signal Cr corresponding to the first pixel and the color difference signal Cb corresponding to the second pixel, determine ¼ of the sum, determine a difference value Ga between the average value Y and ¼ of the sum, and determine a sum of the difference value Ga and the color difference signal Cr corresponding to the first pixel as the pixel value of the first pixel, and determine a sum of the difference value Ga and the color difference signal Cb corresponding to the second pixel as the pixel value of the second pixel.

In a possible implementation, when determining the pixel value of the third pixel and the pixel value of the fourth pixel, the processor 1010 may be further configured to determine a sum of the color difference signal Cr corresponding to the first pixel and the color difference signal Cb corresponding to the second pixel, determine ¼ of the sum, determine a difference value Ga between the average value Y and ¼ of the sum, and determine a sum of the difference value Ga and half of the difference value Dg as the pixel value of the third pixel, and determine a difference value between the difference value Ga and half of the difference value Dg as the pixel value of the fourth pixel. Processes of determining the pixel value of the third pixel and the pixel value of the fourth pixel may also be interchanged.

The foregoing processor may be a central processing unit (CPU), a network processor (NP), or a combination of a CPU and an NP. The processor may further include a hardware chip or another general-purpose processor. The hardware chip may be an application-specific integrated circuit (ASIC), a programmable logic device (PLD), or a combination thereof. The PLD may be a complex PLD (CPLD), a field-programmable gate array (FPGA), a generic array logic (GAL), and another programmable logic device, a discrete gate or transistor logic device, a discrete hardware component, or any combination thereof. The general-purpose processor may be a microprocessor, or the processor may be any conventional processor or the like.

It may be further understood that the memory mentioned in embodiments of this application may be a volatile memory or a nonvolatile memory, or may include a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a random-access memory (RAM) and is used as an external cache. Through example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchlink DRAM (SLDRAM), and a direct rambus (DR) RAM. It should be noted that the memory described in this specification is intended to include but not limited to these memories and any memory of another appropriate type.

An embodiment of this application further provides a computer storage medium, where a computer program is stored. When the computer program is executed by a computer, the computer may be enabled to perform the foregoing image encoding method and/or image decoding method. For example, the method shown in FIG. 4 is performed. For example, the method shown in FIG. 5 is performed.

An embodiment of this application further provides a computer program product that includes instructions. When the computer program product runs on a computer, the computer may be enabled to perform the foregoing provided image encoding method and/or image decoding method. For example, the method shown in FIG. 4 is performed. For example, the method shown in FIG. 5 is performed.

This application provides an image encoding and decoding system, and the system may include an image encoding apparatus for performing an image encoding method, and an image decoding apparatus for performing an image decoding method.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a compact disc (CD) ROM (CD-ROM), an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the other programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the other programmable device, so that computer-implemented processing is generated. Therefore, the instructions executed on the computer or the other programmable device provide steps for implementing a specific function in one or more procedures in the flowcharts and/or in one or more blocks in the block diagrams.

Although some example embodiments of this application have been described, persons skilled in the art can make changes and modifications to these embodiments once they learn the basic concept. Therefore, the following claims are intended to be construed as to cover the example embodiments and all changes and modifications falling within the scope of this application.

It is clear that, persons skilled in the art can make various modifications and variations to embodiments of this application without departing from the spirit and scope of embodiments of this application. In this case, this application is intended to cover these modifications and variations provided that they fall within the scope of protection defined by the following claims and their equivalent technologies.

What is claimed is:

1. An image encoding method comprising:
    obtaining, in a first image, each of a first pixel, a second pixel, a third pixel adjacent to the first pixel, and a fourth pixel adjacent to the first pixel;
    determining, in the first image, a first color difference signal (Cr) corresponding to the first pixel based on a first pixel value of the first pixel, on a third pixel value of the third pixel, and on a fourth pixel value of the fourth pixel;
    determining, in the first image, a second color difference signal (Cb) corresponding to the second pixel based on a second pixel value of the second pixel, on the third pixel value, and on the fourth pixel value, wherein color components of the third pixel and the fourth pixel are the same, and wherein color components of the first pixel, the second pixel, and the third pixel are different;
    determining a first average value (Co) of Cr and the Cb and a first difference value (Cg) between the Cr and the Cb;
    determining a second difference value (Dg) between the third pixel value and the fourth pixel value;

determining a second average value (Y) of the first pixel value, the second pixel value, the third pixel value, and the fourth pixel value; and outputting the Dg, the Y, the Co, and the Cg.

2. The image encoding method of claim 1, wherein determining the Cr comprises determining a third difference value between the first pixel value and a third average value (Ga) as the Cr, wherein the Ga is a value between the third pixel and the fourth pixel.

3. The image encoding method of claim 1, wherein determining the Cb further comprises determining a third difference value between the second pixel value and a third average value (Ga) as the Cb, wherein the Cb is a value between the third pixel and the fourth pixel.

4. The image encoding method of claim 1, wherein a color component of the first pixel is a first color component, wherein a color component of the second pixel is a second color component, and wherein the color components of the third pixel and the fourth pixel are third color components.

5. The image encoding method of claim 4, wherein the first color component is a red component (R), wherein the second color component is a blue component (B), and wherein each of the third color components is a green component (G).

6. The image encoding method of claim 4, wherein the first color component is a red component (R), wherein the second color component is a blue component (B), and wherein each of the third color components is a yellow component (Y').

7. The image encoding method of claim 1, wherein the first pixel, the second pixel, the third pixel, and the fourth pixel form a 2*2 image block in the first image.

8. An image decoding method comprising:
determining, in a first image, a first difference value between a first average value (Co) and half of a second difference value (Cg) as a first color difference signal (Cr) corresponding to a first pixel;
determining, in the first image, a sum of the Co and half of the Cg as a second color difference signal (Cb) corresponding to a second pixel, wherein the Co is an average of the Cr and the Cb, and wherein the Cg is a difference between the Cr and the Cb; and
determining a first pixel value of the first pixel, a second pixel value of the second pixel, a third pixel value of a third pixel, and a fourth pixel value of a fourth pixel based on the Cr and the Cb, on a third difference value (Dg) between the third pixel value and the fourth pixel value, and a second average value (Y) of the first pixel value, the second pixel value, on the third pixel value, and on the fourth pixel value,
wherein color components of the third pixel and the fourth pixel are the same, and
wherein color components of the first pixel, the second pixel, and the third pixel are different.

9. The image decoding method of claim 8, wherein a color component of the first pixel is a first color component, wherein a color component of the second pixel is a second color component, and wherein color components of the third pixel and the fourth pixel are third color components.

10. The image decoding method of claim 9, wherein the first color component is a red component (R), wherein the second color component is a blue component (B), and wherein each of the third color components is a green component (G).

11. The image decoding method of claim 9, wherein the first color component is a red component (R), wherein the second color component is a blue component (B), and wherein each of the third color components is a yellow component (Y').

12. The image decoding method of claim 8, wherein the first pixel, the second pixel, the third pixel, and the fourth pixel form a 2*2 image block in the first image.

13. An apparatus comprising:
a memory configured to store instructions; and
a processor coupled to the memory and configured to execute the instructions to cause the apparatus to:
obtain, in a first image, each of a first pixel, a second pixel, a third pixel adjacent to the first pixel, and a fourth pixel adjacent to the first pixel;
determine, in the first image, a first color difference signal (Cr) corresponding to the first pixel based on a first pixel value of the first pixel, on a third pixel value of the third pixel, and on a fourth pixel value of the fourth pixel;
determine, in the first image, a first color difference signal (Cb) corresponding to the second pixel based on a second pixel value of the second pixel, on the third pixel value, and on the fourth pixel value, wherein color components of the third pixel and the fourth pixel are the same, and wherein color components of the first pixel, the second pixel, and the third pixel are different;
determine a first average value (Co) of the Cr and the Cb and a first difference value (Cg) between the Cr and the Cb;
determine a second difference value (Dg) between the third pixel value and the fourth pixel value;
determine a second average value (Y) of the first pixel value, the second pixel value, the third pixel value, and the fourth pixel value; and
output the Dg, the Y, the Co, and the Cg.

14. The apparatus of claim 13, wherein the instructions, when executed by the processor, further cause the apparatus to determine a third difference value between the first pixel value and a third average value (Ga) as the Cr, wherein the Ga is a value between the third pixel and the fourth pixel.

15. The apparatus of claim 13, wherein the instructions, when executed by the processor, further cause the apparatus to determine a third difference value between the second pixel value and a third average value (Ga) as the Cb, wherein the Ga is a value between the third pixel and the fourth pixel.

16. The apparatus of claim 13, wherein a color component of the first pixel is a first color component, wherein a color component of the second pixel is a second color component, and wherein color components of the third pixel and the fourth pixel are third color components.

17. The apparatus of claim 16, wherein the first color component is a red component (R), wherein the second color component is a blue component (B), and wherein each of the third color components is a green component (G).

18. The apparatus of claim 16, wherein the first color component is a red component (R), wherein the second color component is a blue component (B), and wherein each of the third color components is a yellow component (Y').

19. The apparatus of claim 13, wherein the instructions, when executed the processor, further cause the apparatus to use the first pixel, the second pixel, the third pixel, and the fourth pixel to form a 2*2 image block in the first image.

20. The apparatus of claim 19, wherein the third pixel and the fourth pixel are located in different rows and different columns of the 2*2 image block.

* * * * *